(12) United States Patent
Abdelhadi et al.

(10) Patent No.: US 6,486,894 B1
(45) Date of Patent: Nov. 26, 2002

(54) CONTRASTING GRAPHICAL USER INTERFACE POINTER

(75) Inventors: Sanaa F. Abdelhadi, Austin, TX (US); Hypatia Rojas, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/442,697

(22) Filed: Nov. 18, 1999

(51) Int. Cl.[7] .................................................. G09G 5/08
(52) U.S. Cl. ........................................ 345/765; 345/161
(58) Field of Search ................................. 345/762, 765, 345/764, 840, 161, 162, 163, 157, 158, 173

(56) References Cited

U.S. PATENT DOCUMENTS

| | | | |
|---|---|---|---|
| 5,530,455 A | * | 6/1996 | Gillick et al. ............... 345/163 |
| 5,771,038 A | * | 6/1998 | Wang .......................... 345/163 |
| 6,020,930 A | * | 2/2000 | Legrand ....................... 348/569 |

* cited by examiner

Primary Examiner—Cao H. Nguyen
(74) Attorney, Agent, or Firm—Timothy M. Donoughue; Winstead Sechrest & Minick P.C.; Leslie A. Van Leeuwen

(57) ABSTRACT

An apparatus and method for the display of a graphical user interface (GUI) pointer, such as a mouse pointer, in a GUI system operating in conjunction with a color or monochrome-scale display system having a display screens. The pointer is displayed in a color or shade which contrasts the background and foreground information on the display screen on a pixel-by-pixel basis. The color of the pointer is re-evaluated every time the pointer is moved to insure that the pixel-by-pixel contrast is constantly maintained.

18 Claims, 3 Drawing Sheets

CONTRASTING GRAPHICAL USER INTERFACE POINTER

TECHNICAL FIELD

The present invention relates in general to an apparatus and method for the display of graphical user interface (GUI) pointers, such as mouse pointers, in GUI systems operating in conjunction with color or monochrome-scale display systems.

BACKGROUND INFORMATION

A great number of computer systems use graphical user interfaces (GUIs) to interact with their users. These interfaces are input/output (I/O) systems characterized by the use of graphics to communicate on the computer screen to the computer user. Frequently, the user may use a pointing device, such as a mouse or track ball, as an input device to manipulate and relocate a pointer on the computer screen. By activating or "clicking" the pointing device while the pointer is at a designated position on the screen, a user inputs information into a computer system. Accordingly, a user need not memorize commands or have a knowledge of keyboard typing to provide input to the computer system.

Examples of commercially-available GUI systems include Windows, Cose Desktop, and OS/2. These operating systems may be found on a variety of machines, such as IBM, desktop and portable machines and their compatibles, Solaris computers, MacIntosh computers, and Power PC desktop and laptop machines. In fact, most modern computer users obtain access to their computers through such GUI systems.

Color display systems may be comprised of a color display screen and an interface card to connect the color display screen to the remainder of a computer system. Most GUI systems use color display systems to communicate, or output, to their users. Often, the colors that are displayed on the display screen are selectable by the user and/or definable by a computer programmer. A programmer or user may define one or more colors for the background of the display screen and/or the information displayed thereon, often called the foreground of the display screen. The pointers used in these color systems may also be colored using one or more colors. Like the background and foreground colors on the screen, the pointer color can be defined either by the programmer or by a user to provide for any aesthetic and functional effect desired.

The use of GUI systems in conjunction with color display systems has resulted in a customizable and programmable system that gives rise to several problems. First, it is possible to customize a pointer to be displayed in the same or similar color as a color used in the background or foreground. In such a situation, the pointer may become difficult to see when it is displayed in the same area on the display screen as the corresponding background or foreground color. In fact, in some cases, the pointer may disappear from view altogether. Likewise, in certain monochromatic-scaled display systems, such as gray-scale display systems, the shades used to mimic colors may be so similar as to obscure the pointer from view.

The combination of these systems also presents a concern for the visually challenged. Persons with poor eyesight or who are color blind may have an especially difficult time distinguishing the pointer from the background or foreground colors displayed on the screen. The instant invention addresses the visibility problems inherent in these color and monochrome-scale GUI systems.

SUMMARY OF THE INVENTION

The instant invention is an apparatus and method for display of a pointer under a GUI system. The instant invention analyzes the background and foreground colors over which the pointer is to appear in order to ensure that the pointer color or colors are always contrasting to the background or foreground colors over which the pointer resides. By continually evaluating the color of the existing screen at the location the pointer is to appear and computing a contrasting color on a point-by-point basis, the invention ensures that the pointer will constantly be highly visible to the user.

The foregoing outlines broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

In the following description, numerous specific details are set forth such as byte lengths, color codes, addresses, etc., to provide a thorough understanding of the invention. However, it will be obvious to those skilled in the art that the present invention may be practiced without such specific details. In other instances, well-known circuits, computer equipment, or display facilities have been shown in block diagram form in order to not obscure the present invention in unnecessary detail. For the most part, details concerning timing considerations, specific equipment and programming language as used, display systems and operating systems used, and the like have been omitted in as much as these details are not necessary to obtain a complete understanding of the present invention and are within the skills of persons of ordinary skill in the art.

Within the context of this description, the term "pointing device" is intended to encompass any user input device that can be used to specify a location on the screen and which can be activated to indicate a user selection. While common pointing devices include a mouse, a touch screen and a track ball, many other pointing devices are known in the art, such as digitizing tablets, light pens, and TrackPoint™ tracking device. However, any device which can locate and select a position on a display screen is a "pointing device" within the context of this description.

Figure 1:
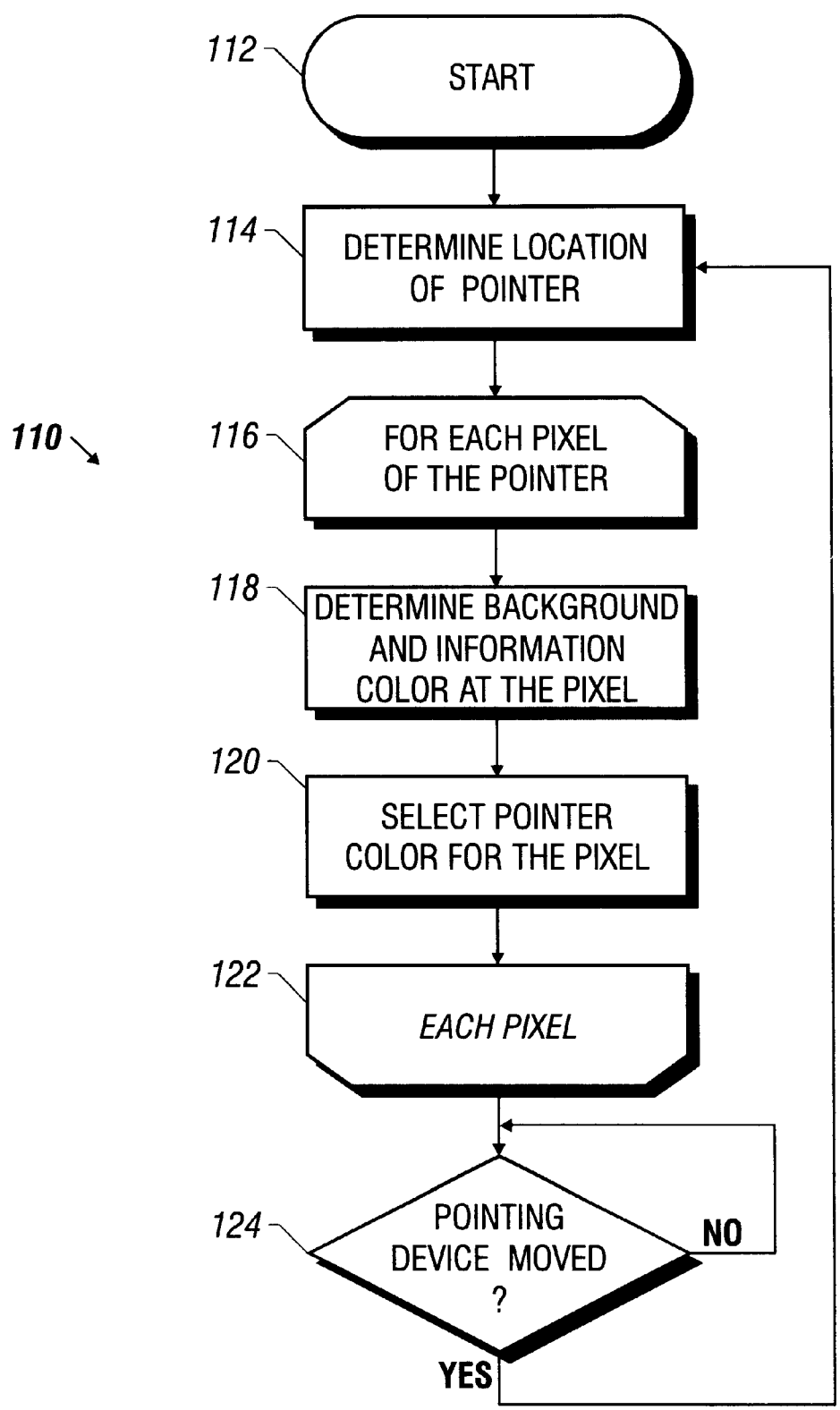
FIG. 1 is a system flowchart diagram illustrating the method of operation of the instant invention according to ANSI/ISO standard 5807-1985.

FIG. 1 depicts the operation of the instant invention. The instant invention involves a program 110. The program 110 is a sequence operable to function within a graphical user interface (GUI) system implemented in a data processing system as described below with respect to FIG. 4. The program 110 begins in a start state 112 where a background color and foreground-colored information is displayed on a display screen 438 (see FIG. 4). The display screen 438 is divided into picture elements ("pixels") for reference to individual locations or points on the display screen 438.

The program 110 first determines the location of the pointer in step 114 on the display screen 438. Such a location can be determined by access to the standard display registers within the display adapter 438 (see FIG. 4) or its software or by access to the GUI registers which track the position of the pointer 214 (see FIG. 2).

Once the pointer location is determined, the program initiates a loop sequence for each pixel within the pointer in step 116. The program 110 determines the background or foreground information color at the pixel in question in step 118. Such color information can be determined by direct access to the display registers within the display adapter 438 or its software or by access to the GUI registers which track the color of the background, objects, the object's position and their colors. The program 110 then selects a pointer color in contrast to the color of the background or foreground information at that pixel in step 120. The loop established for each pixel within the pointer in step 116 continues until the last pixel in the pointer is evaluated in step 122.

Figure 4:
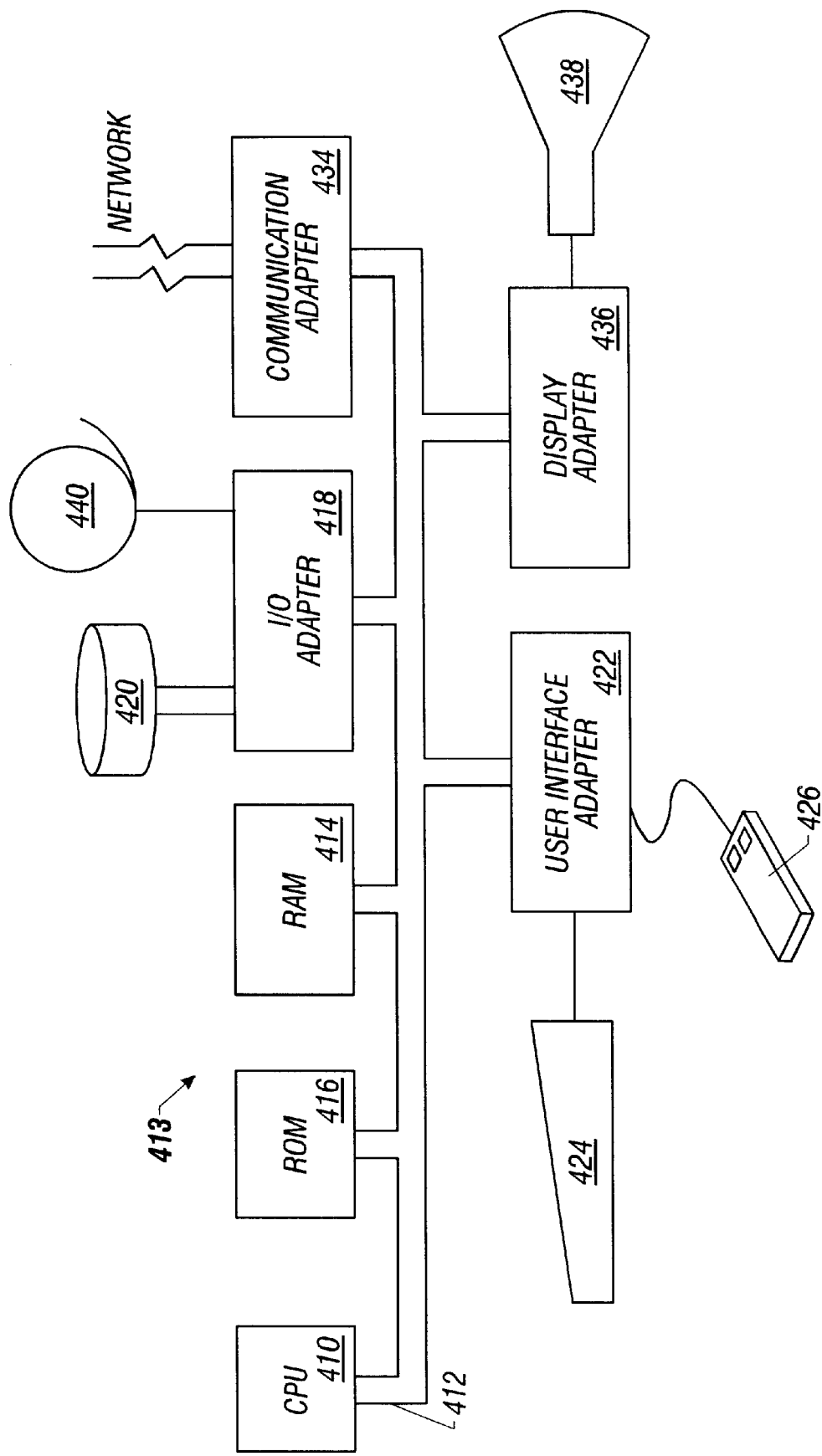
FIG. 4 is a block diagram of a data processing system implementing the instant invention.

The program 110 performs no further operation until the pointer is moved in step 124, usually via relocation of a pointing device 426 (see FIG. 4). Once the pointing device 426 has moved in step 124, the program 110 continues execution by determining the new location of the pointer in step 114.

Those skilled in the art will recognize that such an iterative programming sequence cannot only be written in several programming languages, but may also be functionally translated non-iteratively to object-oriented and other higher-generation programming languages to achieve the same or similar results.

Those skilled in the art will also recognize that the determination of pointer position may be determined a number of ways. In alternative embodiments, the pointer position may be determined by redirecting the interrupt vector table relating to the pointing device 426 and tracking changes in its location independent of the GUI system. Alternatively, various hooks may be provided within the GUI system to provide such information to an external program embodying the program 110 of the instant invention. Contrastingly, another alternative might incorporate the instant invention into the GUI system, so that such pointer position information is available through global variable, referenced variable, or passed function parameter.

Likewise, those skilled in the art will recognize a variety of methods of determination of the background and foreground information colors on the display screen 438. In alternative embodiments, the display screen colors may be determined by redirecting the interrupt vector table relating to and tracking changes in its location independent of the GUI system. Alternatively, various hooks may be provided within the GUI system to provide such information to an external program embodying the program 110 of the instant invention. Contrastingly, another alternative might incorporate the instant invention into the GUI system, so that such pointer position information is available through global variable, referenced variable, or passed function parameter.

Figure 2:
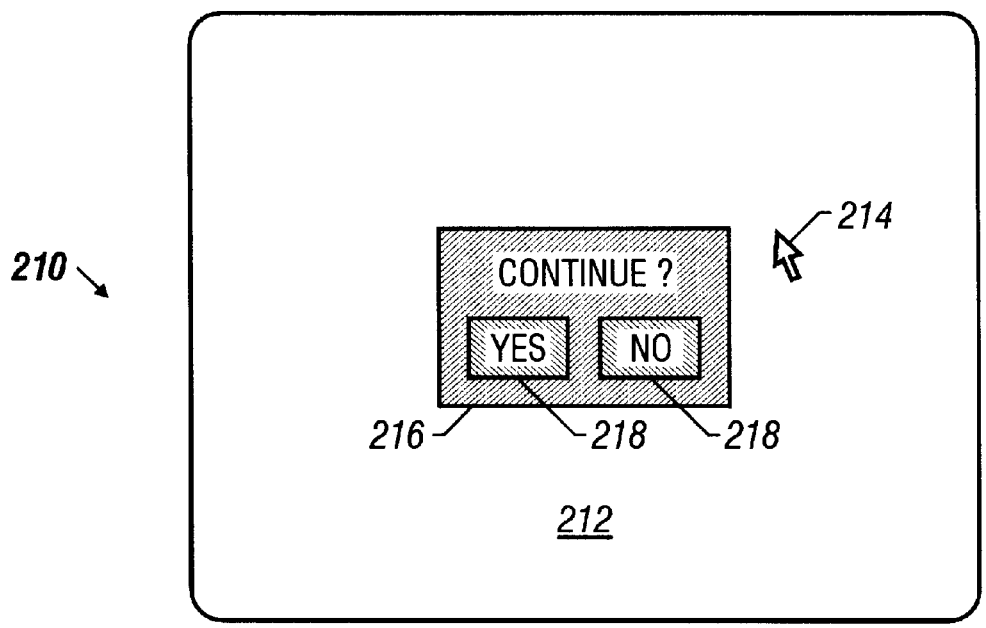
FIG. 2 is a diagram of a graphical user interface (GUI) for interacting with the user.

Further explanation of the present invention is had by reference to FIG. 2. FIG. 2 demonstrates a display screen 210 as it might appear in a GUI system (e.g. display 438 in system 413). The display 210 features a background 212 upon which may reside a colored foreground information box 216 which may contain one or more foreground buttons 218. The present invention manipulates the color of the pointer 214 which appears on the display screen 210. In the normal operation of a GUI system, the pointer 214 may be relocated to the same area of the display screen 210 as the foreground button 218 and the pointing device 426 may be activated or "clicked" in order to make an input selection. As indicated, the foreground box 216 and the foreground buttons 218 may contain output information from a computer system 413 which will make the user's selection of the foreground button 218 meaningful.

Without the instant invention, if the pointer 214 is the same color as the foreground box 216, when the user relocates the pointer 214 to anywhere within the foreground box 216 using the pointing device 426, the pointer will effectively disappear from the display screen 210. If the pointer 214 is of a color similar to the foreground box 216, the pointer 214 may be very difficult to view, especially to a person who is color-blind or has any other type of visual impairment. Likewise, if the pointer 214 is of the same or similar color as the background 212, the pointer 214 will be difficult or impossible to see while the pointer 214 is located over the background 212.

While the present invention is operating, the pointer 214 will have a color contrasting to the background 212 color in the position illustrated. However, as the pointer 214 passes into the foreground box 216, the color of the pointer 214 will be changed pixel-by-pixel to a color which contrasts the color of the foreground box 216 until the entire pointer 214 is within the foreground box 216 and is rendered entirely in the contrasting color. Similarly, as the pointer 214 then passes from within the foreground box 216 to a foreground button 218, the color of the pointer 214 will be changed pixel-by-pixel to a color which contrasts that of the foreground button 218. It should be noted that as these pixel-by-pixel changes occur, the pixels of the pointer 214 which are still within the previous area (e.g. the background 212) remain the color contrasting to that previous area.

Figure 3:
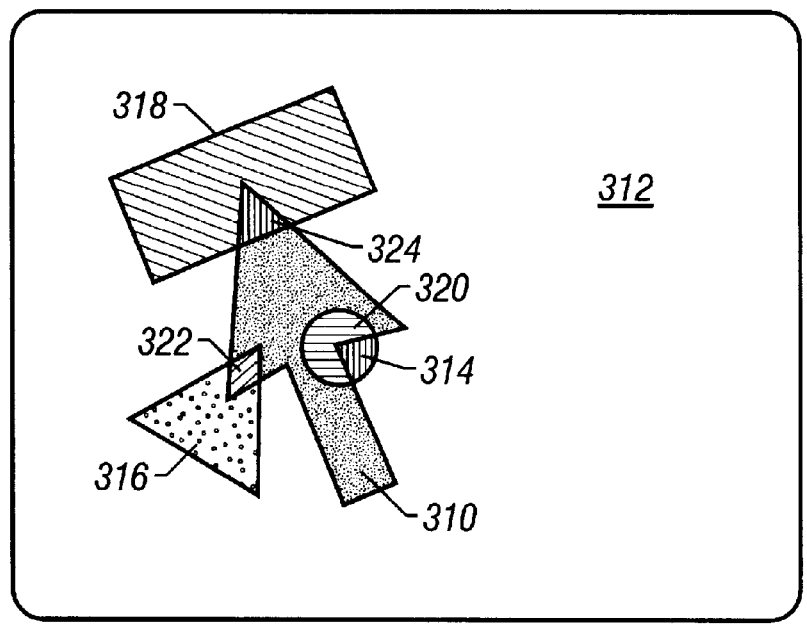
FIG. 3 is a diagram displaying the function of the instant invention as a pointer overlaps several different objects on the screen.

FIG. 3 demonstrates a pointer 310 displayed on a GUI system implementing the present invention. A background 312 is depicted having a foreground triangle 316 displayed in a first color, a foreground rectangle 318 displayed in a second color, and a foreground circle 314 displayed in a third color, where the second and third colors are contrasting. As the pointer 310 passes over each foreground object 316, 318, 314, the color of the pointer in the overlapping area is changed to a contrasting color 322, 324, 320. For example, as the pointer 310 passes over the foreground circle 314, the section of the pointer 310 over the foreground circle 314 is displayed in a contrasting color 320. As the pointer 310 passes over the foreground rectangle 318, the space within the pointer 310 corresponding to the foreground rectangle 318 also changes to a contrasting color 324. The background 312 also has a color associated with it, and while portions of the pointer 310 are not overlapping an object, those portions' color contrasts the color of the background 312.

The determination of a contrasting color (step 120) can be computed using a variety of formulas and methods. For example, if a simple 16 color display system is used, there may be a direct table mapping of contrasting colors:

| Display Color | Contrasting Color |
|---|---|
| 1 | 5 |
| 2 | 16 |
| 3 | 4 |
| 4 | 3 |
| 5 | 1 |
| etc. | |

In such a system, the table is referenced in order to determine the appropriate contrasting color for display.

If a more complex color or monochromatic-scale system is used, the display system may illustrate color or shade on the display screen relative to an assignment of a value for the red, green, and blue components of that color or shade, each being assigned a numerical value. One may compute the total color T according to the formula $$T = C_{Red} + C_{green} + C_{Blue}$$

where $C_{Red}$, $C_{Green}$, and $C_{Blue}$ are the color values for red, green and blue, respectively.

One may then compute the color ratios accordingly:

$$R_{Red} = \frac{C_{Red}}{T} \qquad R_{Green} = \frac{C_{Green}}{T} \qquad R_{Blue} = \frac{C_{Blue}}{T}$$

One may then subtract the maximum value of $R_{Red}$, $R_{Green}$ and $R_{Blue}$ from the minimum of $R_{Red}$, $R_{Green}$, and $R_{Blue}$ in order to determine a contrast method to use. If the difference is a number less than a constant K, which will depend upon the display system, then an all white or all black pointer may be used. If not, the pointer may be shaded to the color represented by the following formulas:

$$Point_{Red} = Max_{Red} - C_{Red}$$
$$Point_{Blue} = Max_{Blue} - C_{Blue}$$

-continued
$$Point_{Green} = Max_{Green} - C_{Green}$$

where $Max_{color}$ is the maximum value attributed to that color within the display system. Such sets of formulas are suitable for Red-Green-Blue (RGB) color display systems, as well as their grey-scale or other monochrome-scale equivalent display systems.

By way of example, in an embodiment in a Windows-based GUI system, each of the component colors in the RGB color display system is represented by a number between 0 and 255. In such a case, all of the above-described formulas may be used, $Max_{Red}$, $Max_{Blue}$, and $Max_{Green}$ each having a value of 255 and the constant K having a value of 10.

It will be appreciated by those skilled in the art that this same type of algorithm may be used to select different contrasting colors based upon the background and foreground information colors over which the pointer is to be displayed. It will be further appreciated that, though the embodiment described is particular to an RGB display system or a similar-grey scale display system, similar embodiments will be possible for other display systems, depending upon the manner in which they represent the colors to be displayed on the display screen.

A representative hardware environment for practicing the present invention is depicted in FIG. 4, which illustrates a typical hardware configuration of data processing system 413 in accordance with the subject invention having central processing unit (CPU) 410, such as a conventional microprocessor, and a number of other units interconnected via system bus 412. Data processing system 413 includes random access memory (RAM) 414, read only memory (ROM) 416, and input/output (I/O) adapter 418 for connecting peripheral devices such as disk units 420 and tape drives 440 to bus 412, user interface adapter 422 for connecting keyboard 424, mouse 426 or other pointing device, and/or other user interface devices such as a touch screen device (not shown) to bus 412, communication adapter 434 for connecting data processing system 413 to a data processing network, and display adapter 436 for connecting bus 412 to display device 438. CPU 410 may include other circuitry not shown herein, which will include circuitry commonly found within a microprocessor, e.g., execution unit, bus interface unit, arithmetic logic unit, etc. CPU 410 may also reside on a single integrated circuit.

Preferred implementations of the invention include implementations as a computer system programmed to execute the method or methods described herein, and as a computer program product. According to the computer system implementation, sets of instructions for executing the method or methods are resident in the random access memory 414 of one or more computer systems configured generally as described above. Until required by the computer system, the set of instructions may be stored as a computer program product in another computer memory, for example, in disk drive 420 (which may include a removable memory such as an optical disk or floppy disk for eventual use in the disk drive 420). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical, biological, or some other physical change. While it is convenient to describe the invention in terms of instructions, symbols, characters, or the like, the reader should remember that all of these and similar terms should be associated with the appropriate physical elements.

Note that the invention may describe terms such as comparing, validating, selecting, identifying, or other terms that could be associated with a human operator. However, for at least a number of the operations described herein which form part of at least one of the embodiments, no action by a human operator is desirable. The operations described are, in large part, machine operations processing electrical signals to generate other electrical signals.

As to the manner of operation and use of the present invention, the same is made apparent from the foregoing discussion. With respect to the above-description, it is to be realized that although specific embodiments and specific material are disclosed, those enabling embodiments are illustrative and the optimum relationships for the parts of the invention are to include variations in form, composition, function, and manner of operation, which are deemed readily apparent to one skilled in the art in view of this disclosure. All equivalent relationships to those illustrated in the drawings and encompassed in this specification are intended to be encompassed in the present invention.

Therefore, the foregoing is considered as illustrative of the principles of the invention and since numerous modifications will readily occur to those skilled in the art, it is not desired to limit the invention to the exact construction and operation shown or described, and all suitable modifications and equivalents may be resorted to, falling within the scope of the invention.

What is claimed is:

1. A graphical user interface (GUI) system on a computer comprising:
    a display system having a display screen having a background, a foreground, and a pointer displayed thereon; and
    a pointing device,
    wherein the pointer is displayed in the same area of the display screen as a portion of the background,
    wherein a first portion of the pointer is automatically displayed in a shade contrasting to the color of the background when the first portion of the pointer is displayed in the same area of the display screen as the background,
    wherein the pointer is displayed in the same area of the display as a portion of the foreground, and
    wherein a second portion of the pointer is displayed in a shade contrasting to the color of the foreground when the second portion of the pointer is displayed in the same area of the display screen as the foreground.

2. The GUI system of claim 1 wherein the pointer has at least one first picture element within the first portion of the pointer and at least one second picture element within the second portion of the pointer.

3. The GUI system of claim 2 wherein the display system is a monochromatic display system,
    wherein the background color is a first color,
    wherein the foreground color is a shade of the first color, and
    wherein the pointer color is a shade of the first color.

4. The GUI system of claim 2 wherein the display system is a color display system,
    wherein the background color is a first color,
    wherein the foreground color is a second color different from the first color, and
    wherein the pointer color is a third color different from the first color and the second color.

5. A method for displaying a pointer on a display screen in a graphical user interface (GUI) system comprising the steps of:
    determining an existing color pattern to be displayed on the display screen;
    determining the location of the pointer on the display screen; and
    for each picture element within the location of the pointer, determining an existing color of the existing color pattern on the display screen at that picture element, computing a contrasting color to the existing color, and displaying the portion of the pointer at that picture element using the contrasting color.

6. The method for displaying the pointer of claim 5 wherein the existing color pattern is comprised of at least one background color and at least one foreground color.

7. The method for displaying the pointer of claim 6 wherein the pointer is comprised of a first portion of the pointer and a second portion of the pointer,
    wherein the first portion of the pointer overlays a background color, and
    wherein the second portion of the pointer overlays a foreground color.

8. The method for displaying the pointer of claim 5 wherein the display system is a monochromatic display system,
    wherein the existing color pattern has a background color being a first color,
    wherein the existing color pattern has a foreground color being a shade of the first color, and
    wherein the existing color pattern has a pointer color being a shade of the first color.

9. The method for displaying a pointer of claim 5 wherein the display system is a color display system,
    wherein the existing color pattern has a background color being a first color;
    wherein the existing color pattern has a foreground color being a second color different from the first color; and
    wherein the existing color pattern has a pointer color being a third color different from the first color and the second color.

10. A computer system comprising:
    a display system having a display screen;
    a pointing device; and
    a memory unit containing a graphical user interface (GUI) program comprising:
    display code operable to define a background and a set of foreground information for display upon the display screen,
    pointer code operable to display a pointer on the display screen responsive to a user manipulating the pointing device wherein the pointer code is further operable to display a first portion of the pointer in a color which contrasts the color of the background when the first portion of the pointer is displayed in the same area of the display screen as the background.

11. The computer system of claim 10 wherein the pointer code is further operable to display a second portion of the pointer in a color which contrasts the color of the set of foreground information when the second portion of the pointer is displayed in the same area of the display screen as the set of foreground information.

12. The computer system of claim 11 wherein the pointer comprises at least one first picture element within the first portion of the pointer and at least one second picture element within the second portion of the pointer.

13. The computer system of claim 12 wherein the display system is a monochromatic display system, wherein the background color is a first color, wherein the foreground color is a shade of the first color, and wherein the pointer color is a shade of the first color.

14. The GUI system of claim 12 wherein the display system is a color display system, wherein the background color is a first color, wherein the foreground color is a second color, and wherein the pointer color is a third color.

15. A computer-readable medium having stored thereon a computer program comprising:

a pointer location code comprising a set of codes operable to direct a computer system to determine the location of a pointer on a computer screen;

a contrasting color selection code comprising a set of codes operable to direct the computer to determine a color of the computer screen for each pixel within the pointer and to determine a contrasting color to the color;

a pointer display code comprising a set of codes operable to direct the computer to display the pointer at the location in the contrasting color for each pixel within the pointer.

16. The computer-readable medium of claim 15 further having stored thereon a computer program comprising:

a display code comprising a set of codes operable to direct the computer to display output information from the computer on the display screen.

17. The computer-readable medium of claim 16 wherein the display codes direct the computer to display output information in at least two colors.

18. The computer-readable medium of claim 16 wherein the display codes direct the computer to display output information in shades of a single color.

* * * * *